No. 622,235. Patented Apr. 4, 1899.
C. M. JOHNSON.
DRIVING WHEEL FOR MOTOR VEHICLES.
(Application filed Apr. 19, 1898.)

(No Model.)

UNITED STATES PATENT OFFICE.

CHARLES M. JOHNSON, OF NEW YORK, N. Y.

DRIVING-WHEEL FOR MOTOR-VEHICLES.

SPECIFICATION forming part of Letters Patent No. 622,235, dated April 4, 1899.

Application filed April 19, 1898. Serial No. 678,194. (No model.)

*To all whom it may concern:*

Be it known that I, CHARLES M. JOHNSON, a citizen of the United States of America, and a resident of New York, State of New York, but temporarily residing at London, England, have invented certain new and useful Improvements in and Relating to Driving and other Wheels for Road Motor-Vehicles and Ordinary Wheeled Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to driving and other wheels for road motor-vehicles and ordinary wheeled vehicles; and it comprises means for preventing said wheels from skidding or slipping, which means is capable of being put into and out of action at the will of the person in charge of the vehicle.

Figure 1:
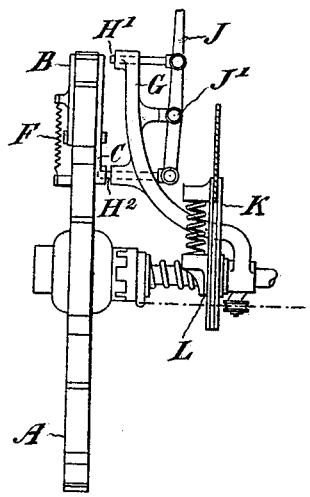
Figure 2:
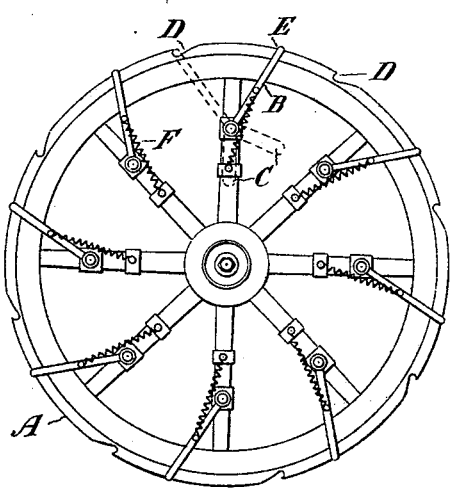

In the accompanying sheet of drawings, Figure 1 is an end elevation, partly in section, of one such arrangement according to my invention. Fig. 2 is a front elevation thereof.

Referring to the drawings, in order to prevent the driving-wheel A from slipping it is provided with a suitable number of links B of any desirable section, which take over the tire of the wheel A and normally are flush with said tire, but when required and while the driving-wheel A is revolving may be caused to project beyond the surface of the said tire in the following manner:

The links B are pivoted on one or both sides of the felly, or, as shown upon the drawings, on both sides of the spokes, and on the inner side of the wheel are provided with an arm or extension C.

For each link B are provided in the tire two slots D and E, the slot D being of sufficient depth to permit of the link being flush with the surface of the tire, while the slot E is of such a depth as to insure the link projecting the required amount beyond the surface of the tire.

A spring F is provided to draw the link into either slot D or E when it has passed a position midway between the said two slots and also to retain the link in either slot.

For each driving-wheel there is provided an arm G, mounted loosely on the revolving axle, passing through the horn plates and sliding therein above the bearings L, thence extending upward to the level of the top of the driving-wheel and carrying two sliding pins H' H² and a lever J, pivoted centrally at J', which operates said sliding pins.

The lever J may be provided with a handle and moved directly or may be operated in any suitable manner from the front of the vehicle. For example, the lever J may be keyed on a rod carried by the arm G at J', said rod being extended to the front of the vehicle and carried there by a swiveling bracket and then partially rotated by a suitable handle or lever.

The links B normally rest in the slots D; but when the driving-wheel begins to slip, owing to the greasiness of the road or to the inclination thereof, the pin H' is pushed out toward the wheel A by means of the lever J, thus causing the pin H' as the wheel revolves to strike small projections (not shown) at or near the top of the links B, throwing them out of the slots D toward the slots E, the springs F causing the links to be seated in the slots E, as already described. The distance of the said projections at the top of the links B from the center of the axle being greater when seated in the slots E than when seated in the slots D enables the said projections to pass the pin H' as the wheels continue to revolve. When the wheel no longer has a tendency to slip, the position of the lever J is reversed, thereby drawing back the pin H' and projecting the pin H² toward the wheel, thus causing said pin H² as the wheel revolves to strike the extensions C of the links B, and thus throw the links out of the slots E toward the slots D, when the springs F cause said links to be seated in the slots D level with the periphery of the tire, whereupon the extensions C are clear of the pin H² as the wheel continues to revolve.

I claim—

1. A wheel having a groove in its periphery, a link hinged to said wheel and adapted to register with said groove, and means for throwing said link in and out of engagement with said groove.

2. A wheel having a groove in its periphery, a spring-pressed link hinged to said wheel and adapted to register with said groove, and means for throwing said link in and out of engagement with said groove.

3. A wheel having a groove in its periphery, a link hinged to said wheel and adapted to register with said groove, a pivoted lever, and a pin carried by said lever for engaging with said link to move the latter.

4. A wheel having a groove in its periphery, a link hinged to said wheel and adapted to register with said groove, an arm projecting from said lever beyond the latter's pivotal point, a support, a lever pivoted to said support, guides carried by said support, pins mounted in said guides and connected with said lever on opposite sides of the latter's pivotal point and adapted to engage with said link and with said arm to move the said link in and out of engagement with said groove.

In testimony that I claim the foregoing as my invention I have signed my name in the presence of two subscribing witnesses.

CHARLES M. JOHNSON.

Witnesses:
HERBERT D. JAMESON,
ALFRED NUTTING.